United States Patent
Stagon et al.

(10) Patent No.: US 11,826,858 B2
(45) Date of Patent: Nov. 28, 2023

(54) AMALGAMATION PREFORM

(71) Applicant: MESOGLUE, INC., Jacksonville, FL (US)

(72) Inventors: Stephen P. Stagon, Jacksonville, FL (US); Chuanwei Zhuo, Lexington, MA (US); Paul Elliott, Marcy, NY (US); Hanchen Huang, Corinth, TX (US)

(73) Assignee: MESOGLUE, INC., Jacksonville, FL (US)

( * ) Notice: Subject to any disclaimer, the term of this patent is extended or adjusted under 35 U.S.C. 154(b) by 304 days.

(21) Appl. No.: 17/073,370

(22) Filed: Oct. 18, 2020

(65) Prior Publication Data
US 2022/0118561 A1 Apr. 21, 2022

(51) Int. Cl.
| | |
|---|---|
| *B23K 35/26* | (2006.01) |
| *B23K 35/02* | (2006.01) |
| *H01F 1/147* | (2006.01) |
| *H01F 1/047* | (2006.01) |

(52) U.S. Cl.
CPC ............ *B23K 35/26* (2013.01); *B23K 35/025* (2013.01); *H01F 1/047* (2013.01); *H01F 1/14733* (2013.01)

(58) Field of Classification Search
CPC ....... B23K 35/26; B23K 35/025; H01F 1/047; H01F 1/14733
See application file for complete search history.

(56) References Cited

U.S. PATENT DOCUMENTS

| | | | | |
|---|---|---|---|---|
| 5,173,256 | A | * | 12/1992 | Booth ....................... C22C 1/02 420/590 |
| 5,346,775 | A | * | 9/1994 | Jin .......................... B23K 35/26 428/614 |
| 8,609,532 | B2 | * | 12/2013 | Swaminathan ... H01L 21/76877 438/622 |
| 2007/0145546 | A1 | * | 6/2007 | Lewis .................. B23K 35/302 257/E23.09 |
| 2009/0014092 | A1 | * | 1/2009 | Ueshima ................ B23K 35/40 228/56.3 |
| 2011/0210283 | A1 | * | 9/2011 | Ramirez .............. H05K 3/3494 252/62.55 |

OTHER PUBLICATIONS

Milea J. Kammer et.al, "Optimization of Cu—Ag Core-Shell Solderless Interconnect Paste Technology" IEEE Transactions on Components, Packaging and Manufacturing Technology, vol. 5, No. 7, 910-920, Jul. 2015 (Year: 2015).*
Karsten Woll et.al, "The utilization of metal/metal oxide core-shell powders to enhance the reactivity of diluted thermite mixtures" Combustion and Flame 167 (2016) 259-267 (Year: 2016).*

* cited by examiner

*Primary Examiner* — Brian D Walck
*Assistant Examiner* — Nazmun Nahar Shams
(74) *Attorney, Agent, or Firm* — ANOVA LAW GROUP, PLLC

(57) ABSTRACT

An amalgamation preform is provided. The amalgamation preform includes a base metal, and a plurality of types of solid particles dispersed in the base metal, the base metal including one of a liquid base metal and a solid base metal. The plurality of types of solid particles at least includes: non-reactive magnetic particles, responsive to a magnetic field for controllably dispersing the plurality of types of solid particles in the base metal, and reactive particles, reactable with the base metal under the magnetic field.

20 Claims, 10 Drawing Sheets

AMALGAMATION PREFORM

CROSS-REFERENCE TO RELATED APPLICATIONS

This application claims the priority to the provisional application No. 62/888,529, filed on Aug. 18, 2019, the entire content of which is incorporated herein by reference.

FIELD OF THE DISCLOSURE

The present disclosure generally relates to the field of bonding and joining technology and, more particularly, relates to amalgamation preform.

BACKGROUND

Classical bonding and joining techniques employing soldering or brazing require addition of thermal energy and flux. In both soldering and brazing, thermal energy is required to melt the joining or filler material to allow it to flow, to contact surfaces, and to create a bond. Flux is required to remove oxides and contaminants from the mating surfaces and the filler, and to protect the filler material from environmental oxidation. Generally, oxidation of filler material having an oxide layer on the filler material is detrimental to the formation of the joint and must be prevented.

BRIEF SUMMARY OF THE DISCLOSURE

One aspect of the present disclosure provides an amalgamation preform. The amalgamation preform includes a base metal, and a plurality of types of solid particles dispersed in the base metal, the base metal including one of a liquid base metal and a solid base metal. The plurality of types of solid particles at least includes: non-reactive magnetic particles, responsive to a magnetic field for controllably dispersing the plurality of types of solid particles in the base metal, and reactive particles, reactable with the base metal under the magnetic field.

Optionally, the base metal includes Ga, In, Sn, Bi, Pb, Cd, Hg, Rb, Zn, Bi, or a combination thereof.

Optionally, the reactive particle at least includes a reactive metal material, the reactive metal material including Fe, Ni, Cu, Ag, Au, In, Cu, Sn, Bi, Zn, Ti, V, Cr, Mo, Nb, Zr, Hf, Pt, Ir, or a combination thereof.

Optionally, a particle of the reactive particle includes a core-shell structure. The core-shell structure includes a core material, and a shell material different than the core material and at least partially surrounding the core material, and the core material has a reaction rate with the base metal different than the shell material.

Optionally, the shell material has a thickness ranging from a thickness of an atomic layer to a thickness of about 100 nm.

Optionally, the core material includes a reactive metal material, and the shell material includes an oxide layer of the reactive metal material.

Optionally, the core-shell structure includes one or more of: a core-shell structure having the shell material including an oxide of one or more of Fe and Ni, and the core material including the one or more of Fe and Ni; a core-shell structure having the shell material including Cu, and the core material including Au; a core-shell structure having the shell material including steel, and the core material including Cu; a core-shell structure having the shell material including ZnO or TiO$_2$, and the core material including Cu, Ag, Ni, or a combination thereof; and a core-shell structure having the shell material including Cu and copper oxide at least partially covering Cu, and the core material including Co, BeO, Si$_3$N$_4$, B$_4$C, WC, diamond, AlN, SiC, SiO$_2$, TiO$_2$, ZrO$_2$, Al$_2$O$_3$, or a combination thereof.

Optionally, the reactive particle includes a reactive magnetic particle, a reactive non-magnetic particle, or a combination thereof.

Optionally, the reactive magnetic particle includes one or more of Fe and Ni.

Optionally, the reactive magnetic particles have an average large size of more than about 50 microns.

Optionally, the reactive non-magnetic particle includes Cu, Ag, Au, In, Cu, Sn, Bi, Zn, Ti, V, Cr, Mo, Nb, Zr, Hf, Pt, Ir, or a combination thereof.

Optionally, a ratio of the base metal over the plurality of types of solid particles ranges from 4:1 to 1:4 by weight.

Optionally, the plurality of types of solid particles have an average size ranging from about 100 nm to about 100 μm.

Optionally, the reactive particles have an average size ranging from about 100 nm to about 50 μm.

Optionally, the non-reactive magnetic particles have an average size ranging from about 5 microns to about 100 microns.

Optionally, the non-reactive magnetic particles include Co-containing particles, Nd-containing particles, Cr-containing particles, or a combination thereof.

Optionally, the non-reactive magnetic particles include large-size magnetic particles having at least one dimension greater than 5 μm, and the large-size magnetic particles include microwires, microfibers, or combination thereof.

Optionally, the plurality of types of solid particles further includes additives, including semiconductor particles, metal doped semiconductor particles, or combination thereof, and the semiconductor particles include SiC particles, AlN particles, SiO$_2$ particles, or a combination thereof.

Optionally, a playdough-like amalgamation preform includes the plurality of types of solid particles magnetically dispersed in the liquid base metal, and no reactions substantially occur between the reactive particles and the liquid base metal at a temperature of about 25° C. or less.

Optionally, a solid amalgamation preform includes the plurality of types of solid particles magnetically dispersed in the solid base metal, and no reactions substantially occur between the reactive particles and the solid base metal at a temperature of about 25° C. or less.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the present disclosure, which are illustrated in the accompanying drawings. Wherever possible, the same reference numbers will be used throughout the drawings to refer to the same or like parts.

Figure 1A:
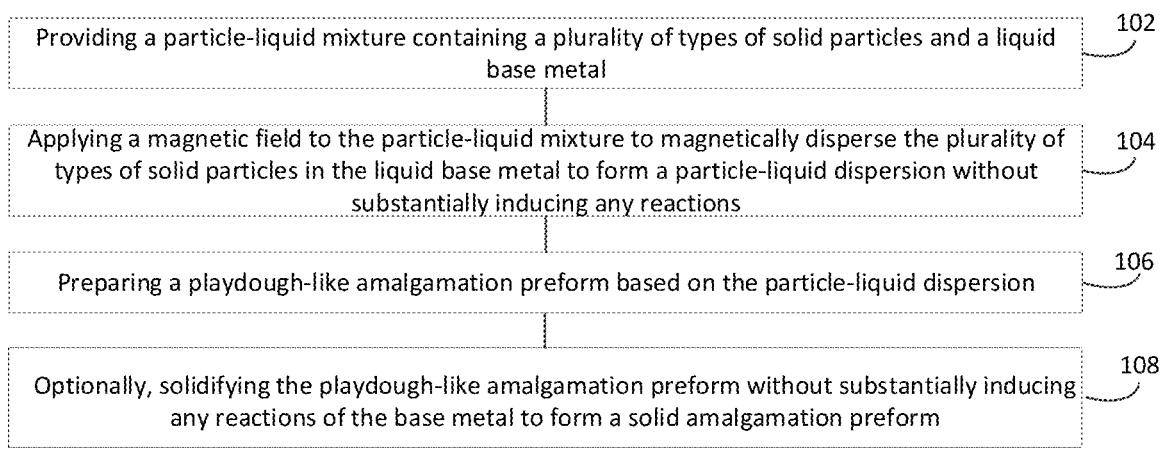
FIG. 1A illustrates an exemplary method of making an amalgamation preform according to various embodiments of the present disclosure.
Figure 1B:
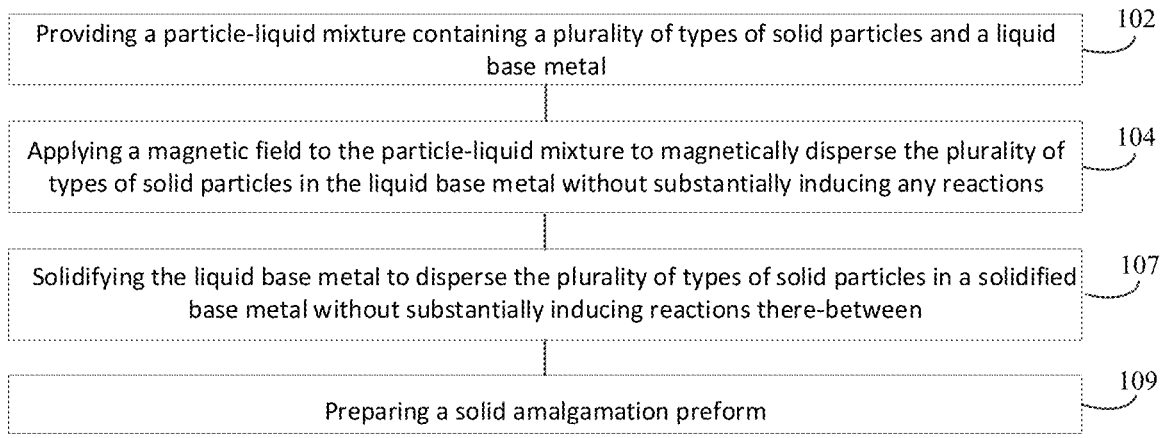
FIG. 1B illustrates another exemplary method of making an amalgamation preform according to various embodiments of the present disclosure.

FIGS. 1A-1B illustrate exemplary methods of making an amalgamation preform according to various embodiments of the present disclosure.

At 102 in FIGS. 1A-1B, a particle-liquid mixture containing a plurality of types of solid particles and a liquid base metal (i.e., a base metal in a liquid form) is provided, e.g., in a container.

In one embodiment, for providing the particle-liquid mixture, the plurality of types of solid particles may be mixed with the base metal in a solid form (e.g., solid particles of the base metal or base metal particles), in the container. The base metal particles and/or the plurality of types of solid particles may be in a form of metal powder, pellet, wire, fiber, ingot, or any combination thereof. The base metal particles and the plurality of types of solid particles may be mixed, e.g., at room temperature. The base metal particles may then be melted, e.g., by any suitable heating process, into a liquid form, together with the mixed plurality of types of solid particles to form the particle-liquid mixture. For example, the base metal particles may be melted by convective or inductive heating caused by application of a magnetic field. The magnetic field may be controlled/modulated to heat the base metal without breaking structures of other particles in the mixture.

Alternatively, to form the particle-liquid mixture, the base metal particles may be melted to form a liquid base metal in a container, followed by injecting the plurality of types of solid particles into the liquid base metal to form the particle-liquid mixture.

The base metal may include metal and/or metal alloys, that have low melting point. For example, the base metal may have a melting point less than about 200° C. The base metal may include, for example, Ga, In, Sn, Bi, Pb, Cd, Hg, Rb, Zn, Bi, or any combination/alloy thereof. In certain embodiments, the base metal may include Ga, GaInSn, and/or InSnBi.

In the particle-liquid mixture, a ratio of the liquid base metal over the plurality of types of solid particles may range from about 4:1 to about 1:4 by weight, for example, ranging from 4:1 to 1:2, such that the plurality of types of solid particles is in an amount for easy handling in the liquid state but with sufficient mechanical properties. The plurality of types of solid particles may have an average size ranging from about 100 nm to about 100 µm.

Various types of solid particles may be mixed with the base metal. For example, the plurality of types of solid particles may include reactive particles, non-reactive magnetic particles, and/or any suitable additives for providing desirable features to the particle-liquid mixture and/or the subsequently formed amalgamation preform.

The reactive particles may be reactable with the base metal. The reactive particle may at least include a reactive metal material. The reactive metal material may include Fe, Ni, Cu, Ag, Au, In, Cu, Sn, Bi, Zn, Ti, V, Cr, Mo, Nb, Zr, Hf, Pt, Ir, and/or any combination (e.g., alloy) thereof.

The reactive particles may have an average size ranging from about 100 nm to about 50 µm, for example, ranging from about 100 nm to about 25 µm. For a desirable reactivity, the reactive particles may be selected not too large nor too small. The too-large reactive particles may take too long time to react with base metal, while the too-small particles may react too quickly. It is the inventors' finding that when the reactive particles have a size of less than 100 nm, the reactions between the reactive particles and the base metal may be undesirably too fast for the alloying.

The reactive particles may be magnetic and/or non-magnetic. For example, reactive magnetic particles may include Fi, Ni, and/or their alloys. Reactive non-magnetic particles may include Cu, Ag, Au, In, Cu, Sn, Bi, Zn, Ti, V, Cr, Mo, Nb, Zr, Hf, Pt, Ir or any combination (e.g., alloy) thereof. In addition to being reactable with the base metal, in some embodiments, the reactive magnetic particles may also be able to respond to a magnetic signal.

The reactive particle, either magnetic or non-magnetic, may include a core-shell structure. The core-shell structure may include a core material and a shell material different than the core material and at least partially surrounding the core material. The core material may have a reaction rate with the base metal greater than the shell material, or vice versa.

In some embodiments, the core-shell structure of the reactive particle may include an oxide shell material at least partially covering a reactive metal material as a core material. The oxide shell material may include an oxide material of the reactive metal material. The oxide shell material may be a native oxide material or may be intentionally formed by an oxidation reaction, such as thermal oxidation, with the reactive metal material. For example, when the reactive metal material is one or more of Fe and Ni as a core material, the shell material may be an oxide of the one or more of Fe and Ni. Unlike conventional preform material in which oxide shell layer must be eliminated for forming and using the amalgamation preform, the disclosed oxide shell layer is needed to control reaction kinetics/rates for forming and using the amalgamation preform.

In other embodiments, the core-shell structure of a reactive particle may include non-oxide shell material. For example, the core-shell structure may include one or more of: a core-shell structure having the shell material including Cu, and the core material including Au; a core-shell structure having the shell material including steel, and the core material including Cu; a core-shell structure having the shell material including ZnO or $TiO_2$, and the core material including Cu, Ag, Ni, or a combination thereof; and/or a core-shell structure having the shell material including Cu and copper oxide at least partially covering Cu, and the core material including Co, a ceramic material including AlN, SiC, $SiO_2$, $TiO_2$, $ZrO_2$, $Al_2O_3$, BeO, $Si_3N_4$, $B_4C$, WC, and/or diamond, or a combination thereof.

In various embodiments, the core material may be multi-layered formed by, e.g., at least one material reactive with the base material and at least another material to provide desirable properties (e.g., providing improved mechanical strength) to the subsequently formed amalgamation preform. Optionally and additionally, the shell material may also be multi-layered. For example, when the shell material includes copper, e.g., for reacting with the base metal, the copper shell material may include an additional shell layer of copper oxide at least partially covering the copper shell material.

In various embodiments, the particle-liquid mixture may be magnetically dispersed to form a particle-liquid dispersion (e.g., as illustrated at operation 104 in FIGS. 1A-1B), which may be a homogeneous dispersion without substantially inducing any reactions (e.g., alloying reactions) between reactive particles and the base metal. The particle-liquid dispersion may be used to form an amalgamation preform, including a playdough-like amalgamation preform (e.g., as illustrated at operation 106 in FIG. 1A), and a solid amalgamation preform (e.g., as illustrated at operations 108 and 109 in FIGS. 1A-1B), as disclosed herein. The amalgamation preform may then be used directly for bonding/curing/alloying or be stored/transported for a later/future use.

As disclosed herein, in one embodiment, the shell material of reactive particles may be used to control kinetics and dissolution rates of the core material to thus control shelf life and/or reaction rates, e.g., of the formed amalgamation preform.

The core-shell structure of the reactive particle may at least further allow extension of shelf life of the formed amalgamation preform. For example, the shell material may be thick enough to largely prevent solid-state alloying between the reactive particles and solid base metal and thin enough to be overcome to undergo such reactions during reflow. The shell material may have a thickness ranging from a thickness of an atomic layer to a thickness of about 100 nm. For example, the shell material may have a thickness of several atomic layers. The thickness of the shell material may be controlled depending on the selection of the base metal and the reactive particles, and/or a target shelf life of the formed amalgamation preform.

In an exemplary amalgamation preform having a reactive particle that the core material is one or more of Fe and Ni, and the shell material is an oxide of the one or more of Fe and Ni, the rate of dissolution or ingress by the exemplary base metal Ga material through the shell material is dependent on the thickness of the shell material. In an example for forming a playdough-like amalgamation preform for a quick use, the shell material can be relatively thin for a quick setting and the thickness can be increased to extend the handling and setting time of the material. For forming a solid amalgamation preform, the shell material can be thick enough, e.g., at least several nm, such that there is no reaction during the initial mixing and subsequent solidification (e.g., for several minutes). The reaction and ingress rate of the liquid base metal through the shell material may increase with temperature, which may allow for long shelf lives at near room temperature but have rapid curing at processing temperatures.

According to various embodiments, in addition to controlling shell thickness, other mechanisms may be applied to the core-shell structure of the reactive particles to thus control shelf life, reaction kinetics/rates of the formed amalgamation preform.

For example, an amalgamation preform may contain a reactive particle including a shell material that reacts with the base metal more slowly than the core material to provide longer preform processing time. For example, the shell material may be copper and the core material may be gold, and the base metal may be Ga liquid, which reacts quicker with gold than Copper.

Another exemplary amalgamation preform may contain a reactive particle, including a reactive shell material (e.g., Cu) and a non-reactive core material (e.g., Co, and/or a ceramic material including AlN, SiC, $SiO_2$, $TiO_2$, $ZrO_2$, $Al_2O_3$, BeO, $Si_3N_4$, $B_4C$, WC, and/or diamond). In some cases, the reactive shell material may include multi-layer having an oxide layer at least partially covering the reactive shell material. In one example, the shell material may be Cu and the core material may be Co, while the shell material may further include copper oxide covering the copper shell material. The magnetic properties of Co may be utilized for heating, mixing, and/or wetting, while the shell material may allow for a coherent interface and strong bonding of the preform material with a bonding surface. In another example, the shell material may be Cu and the core material may be a ceramic material such as AlN, while the shell material may further include copper oxide covering the copper shell material. Such reactive particle may provide a slow reaction rate and provide an extended shelf life of the formed amalgamation preform.

In various embodiments, the shell material may be selected to incorporate to support and strengthen the matrix/bulk of the amalgamation preform.

In an exemplary amalgamation preform, the shell material of the reactive particle may be non-reactive and/or may partially cover the inner particle of a reactive core material (e.g., as a patchy shell). When the inner particle is dissolved by the Ga liquid, the shell material may remain in the perform material to provide mechanical strengthen and form a composite. Such shell material may include a ductile material, including steel, and the core material may be Cu. In another example, the shell material may be a brittle oxide, such as ZnO and/or $TiO_2$, which can rupture due to mismatch of thermal expansion with the Cu, Ag, and/or Ni metal which is used as core material inside the shell material. The hard and brittle shell material may strengthen the matrix/bulk of the amalgamation preform when being processed.

In various embodiments, the shell material may be broken during preform processing. For example, the shell material of the reactive particle may be overcome via dissolution of the base metal due to, e.g., application of a magnetic field. For example, under control of magnetic field, an oxide shell material may be broken to allow its core material Fe or Cu to interact/react with the liquid base metal.

The plurality of types of solid particles may further include non-reactive magnetic particles. The non-reactive magnetic particles may not be reactable with the base metal but may be responsive to magnetic signals, for example, to facilitate/drive heating, mixing, and/or wetting of the particle-liquid mixture (e.g., as illustrated at operation 104 in FIGS. 1A-1B). For example, the non-reactive magnetic particles may include Co-containing particles, Nd-containing particles, and/or Cr-containing particles.

The non-reactive magnetic particles may have an average size ranging from about 1 micron to about 100 microns, e.g., ranging from about 5 microns to about 100 microns. For example, the non-reactive magnetic particles may include large-size magnetic particles having at least one dimension greater than 5 μm. Such large-size magnetic particles may include microwires, microfibers, or combination thereof.

In some cases, large-size magnetic particles, e.g., microwires and/or microfibers, may be added as solid particles to further facilitate heating, mixing and/or wetting properties of the particle-liquid mixture in a container or placed between bonding surfaces and/or to further provide desirable features. The large-size magnetic particles may be reactive or non-reactive. For example, reactive and magnetic Fe and/or Ni particles in large size (e.g., more than about 50 microns) may be added in the particle-liquid mixture to provide desirable mixing and wetting for dispersion and to at least partially participate the reactions for bonding/curing.

Optionally and additionally, the plurality of types of solid particles may include any other particles to provide the subsequently formed amalgamation preform with desired features/properties. For example, semiconductor particles and/or metal doped semiconductor particles (such as SiC, AlN, $SiO_2$, and/or diamond, with or without dopant) may be added as additives particles to provide improved thermal conductivity of the formed amalgamation preform, while decreasing electrical conductivity of the amalgamation preform. In some cases, the additive particles, regardless being reactive, non-reactive, magnetic, or non-magnetic, may further be added in the particle-liquid mixture to facilitate heating, mixing, and/or wetting properties when forming or processing the amalgamation preform.

Figure 2:
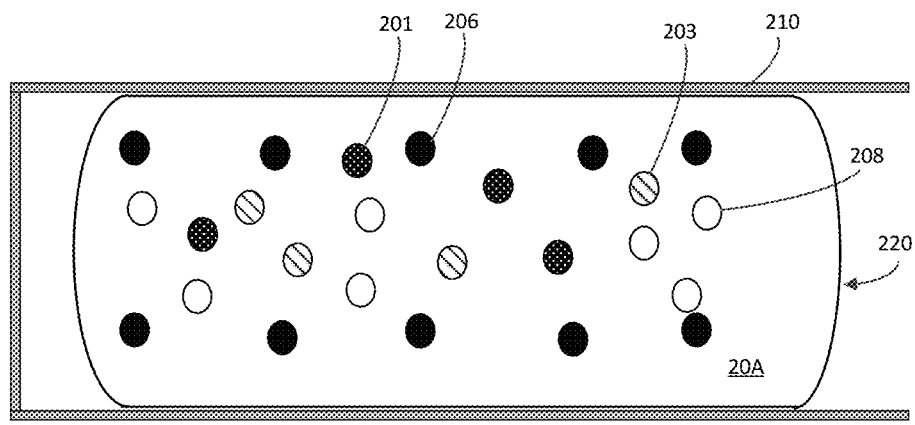
FIG. 2 illustrates an exemplary particle-liquid mixture in a container according to various embodiments of the present disclosure.

FIG. 2 illustrates an exemplary particle-liquid mixture in a container according to various embodiments of the present disclosure. As disclosed, particle(s) illustrated in FIG. 2 may be altered and/or omitted, and more particles may be included in the exemplary particle-liquid mixture.

As shown in FIG. 2, an exemplary particle-liquid mixture 220 includes a liquid base metal 20A, mixed with various particles as disclosed herein including, e.g., reactive particles 201/203 (e.g., at least including reactive magnetic particles 201 and reactive non-magnetic particles 203), non-reactive magnetic particles 206, and/or any other appropriate solid additives 208.

The particle-liquid mixture 220 is contained in the container 210. The container 210 may be used for mixing, dispersion, and/or solidification. The container 210 may be polymeric, with or without fillers, to minimize the bonding strength between the contained mixture and inner surface of the container. For example, the container 210 may at least include a plastic surface, for contacting the particle-liquid mixture, made of a material including polytetrafluoroethylene (PTFE or Teflon), high-density polyethylene (HDPE), or low-density polyethylene (LDPE), that has low surface energy to prevent wetting. Of course, the container may be made of any other suitable material including a metallic, ceramic, or non-polymer material, with or without having the plastic surface thereon.

At 104 in FIGS. 1A-1B, a magnetic field is applied to the particle-liquid mixture to magnetically disperse the plurality of types of solid particles in the liquid base metal to form a particle-liquid dispersion. The magnetic field may be applied in a manner without substantially inducing any reactions between the solid particles and the liquid base metal.

As disclosed herein, the particle-liquid dispersion may refer to magnetically dispersed particle-liquid mixture, where the plurality of types of solid particles may be controllably dispersed, for example, substantially homogenously dispersed in the liquid base metal by applying a magnetic field.

FIGS. 3-7 illustrate controllable applications of magnetic field to the exemplary particle-liquid mixture 220 in the container 210 to magnetically disperse the plurality of types of solid particles (e.g., particles 201, 203, 206, and/or 208) in the liquid base metal 20A to form a particle-liquid dispersion.

Although the container illustrated in FIGS. 2-7 is placed in a manner having an opening at a side and a length direction (as indicted in FIG. 3) substantially perpendicular to the opening side, the container may be placed in any manner or at any angle as desired according to various embodiments of the present disclosure. Additionally, the particle-liquid mixture contained in the container may be situated having a thickness from an inner wall of the container, the thickness covering a partial width/diameter or an entire width/diameter of the container.

Figure 3:
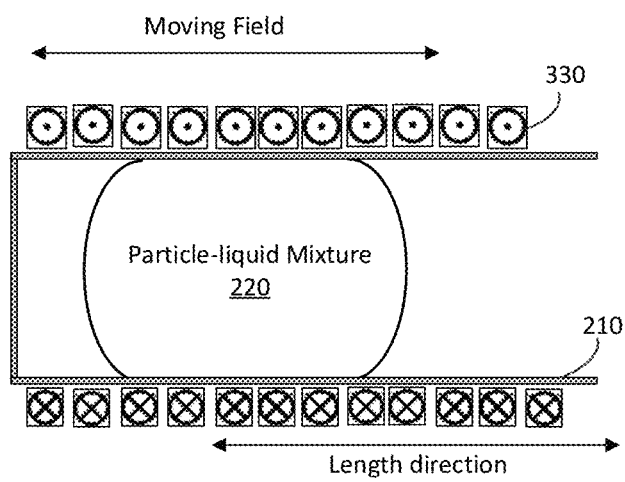
FIG. 3 illustrates an exemplary apparatus including a magnetic processing device for processing a particle-liquid mixture according to various embodiments of the present disclosure.

Referring to FIG. 3, the container 210 containing particle-liquid mixture 220 may be placed in a magnetic field, e.g., generated by a magnetic processing device 330.

In one embodiment, the magnetic processing device 330 may include coils winding around the container 210. The shape and/or dimension of the wire used in a coil winding may be determined based on the specific application of the magnetic field. For example, the coil winding may have, e.g., uniform shape and dimension, and may be wound evenly or un-evenly distributed along the length direction of the container 210.

The magnetic processing device 330 may be connected to or include a controller (not shown), such as a computer controller, to control current and/or current changing of the coil winding and to thus control, e.g., polarity, strength, localization, motion, orientation, rotation, spinning, etc. of the magnetic field. For example, a certain length of coils may be selected by the controller to selectively apply the magnetic field to a partial amount of the particle-liquid mixture to locally disperse solid particles in the particle-liquid mixture. In another example, the magnetic field may be controlled and changed along a certain direction, e.g., the length direction of the container. In still another example, the controller may control the coils winding to repeatedly provide rotational field and/or translational field, e.g., back and forth along a certain direction. In still another example, the controller may control the coils winding to move the particle-liquid mixture between different positions, from one position to another, along the inner wall of the container, or to move the particle-liquid material out of the container without physical handling of the material.

The magnetic field may be applied in any suitable manner. Other suitable magnetic processing device may include electromagnets and/or physical permanent magnets. For example, in a proximity to the particle-liquid mixture contained in the container, an electronic control of electromagnets and/or a control of moving physical permanent magnets may be performed to provide the magnetic field.

In some embodiments, the container in FIGS. 3-7 may be disposed within the magnetic processing device.

Figure 4:
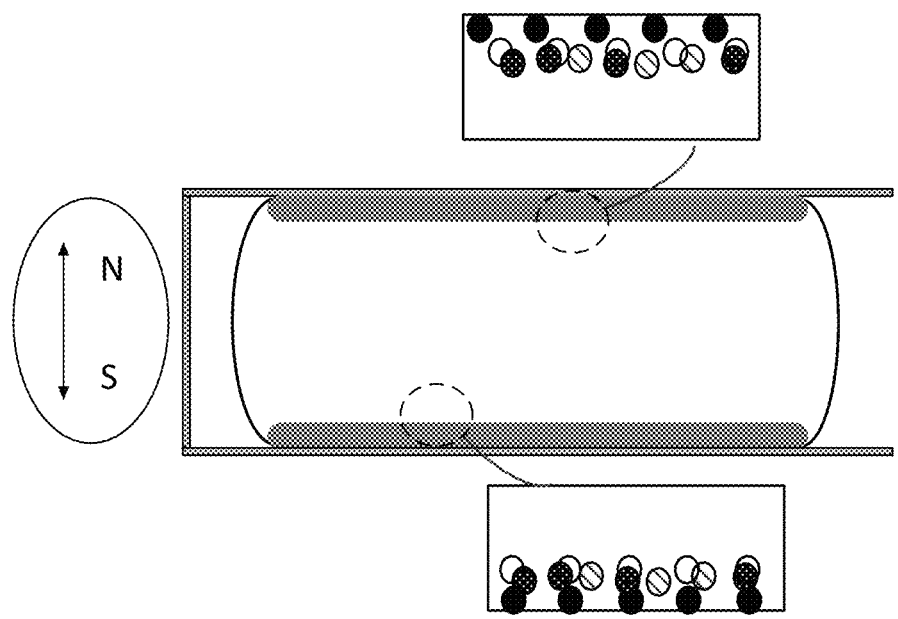
FIGS. 4-7 illustrate controllable applications of magnetic field to a particle-liquid mixture in a container according to various embodiments of the present disclosure.

In one embodiment, the magnetic field may be applied and aligned, such that solid particles in the liquid base metal may be pulled and moved towards interfaces with the container, e.g., as shown in FIG. 4 illustrating that the solid particles, including the reactive magnetic particles 201, the reactive non-magnetic particles 203, the non-reactive magnetic particles 206, and the solid additives 208 (referring to FIG. 2), are pulled and moved to the interfaces with the container. In the meanwhile, the magnetic field may be used to heat and maintain the base metal in the liquid form, without applying further heating for reactions.

Figure 5:
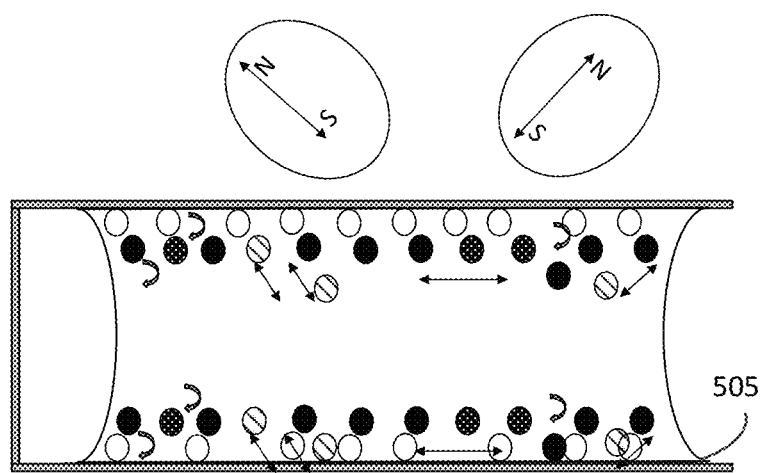
Figure 6:
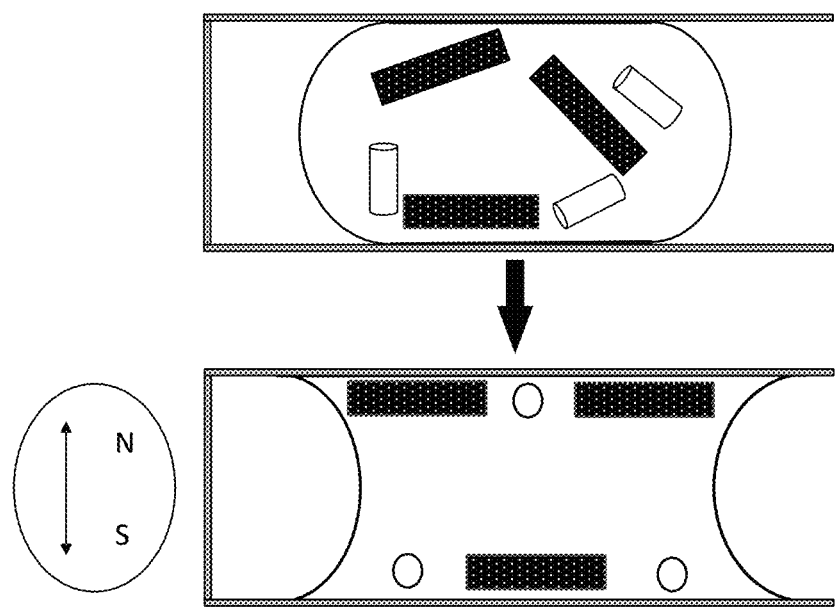

The magnetic field may be moved in various angles to drag the solid particles across surfaces of the container, e.g., moving through the cross section of the particle-liquid mixture, in any suitable shape or motion path, e.g., as shown in FIG. 5 illustrating that the solid particles, including the reactive magnetic particles 201, the reactive non-magnetic particles 203, the non-reactive magnetic particles 206, and the solid additives 208 (referring to FIG. 2), are dragged on the container surface. The solid particles dragging on the container surface may scrape, remove, and/or break the native oxide layer formed at the outermost layer 505 of the particle-liquid mixture at the mixture-container interface, allowing for wetting. In some embodiments, large-size particles may allow for more force compared to the viscous forces experienced in the particle-liquid mixture and may have a better chance of making the solid particles move to the mixture-container interface, e.g., as shown in FIG. 6. As such, motion of magnetic particles may be controlled to improve surface wetting, and to reduce voiding and gaps that are often generated in conventional solder materials.

Figure 7:
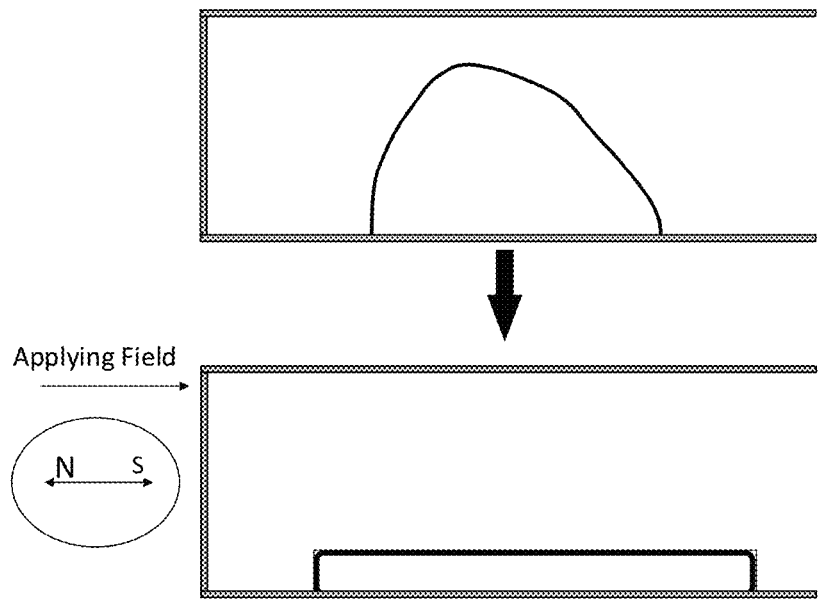

The application of the magnetic field may allow movement and dispensing of all solid particles in the particle-liquid mixture. Instead of driving via a mechanical force which often compresses the particles and drives the liquid component out, the disclosed particle-liquid mixture/dispersion may be moved as a slug from one position to another and does not squeeze out the liquid component. Additionally, the magnetic field can also be used to smooth the particle-liquid mixture after it is dispensed as a large "slug" as shown in FIG. 7.

The non-reactive solid particles may thus be used to drive, spread, mix, and/or heat the particle-liquid mixture for forming homogeneous particle-liquid dispersion and thus forming amalgamation preform with high quality. When the amalgamation preform being processed, the non-reactive solid particles may be used to drive the curing and/or strengthen a corresponding particle-liquid mixture/dispersion for bonding.

In one embodiment, a gradient static magnetic field may be used to align magnetic fibers or wires within the particle-liquid mixture to provide preferential and anisotropic properties, e.g., as shown in FIG. 6. For example, large size magnetic particles of Fe, Ni, Co, Cr, Nb, and/or their alloys may be incorporated into the particle-liquid mixture for forming the amalgamation preform or for bonding/curing/alloying when processing the amalgamation preform. The magnetic alignment may be varied to produce various properties, such as anisotropic thermal conductivity and/or mechanical strength.

Instead of having a conventional mechanical mixing, the disclosed magnetic mixing/dispersing may be performed under a magnetic field, such that various particles may be oriented, moved, and/or aligned along the entire cross section of the particle-liquid mixture.

For example, under dynamic magnetic field or a helical magnetic field, motions of the solid magnetic particles (being reactive or non-reactive with or without large-size) may be driven through the liquid base metal. The shape of the mixing may be designed, for example, to mimic the amalgamation preform in target. The disclosed magnetic mixing/dispersing may be in random or ordered fashion and can be done simultaneously with magnetic heating.

The disclosed magnetic mixing/dispersing may allow the subsequently formed amalgamation preforms to have reactive materials/particles sufficiently separated for drastically increasing shelf life of the formed amalgamation preform. When the amalgamation preform is ready for bonding, the separated materials in the amalgamation preform can be reflowed and re-dispersed either before being placed on the bonding surfaces or after bringing the bonding surfaces into contact. In some cases, in the amalgamation preform, the material can be roughly mixed as clumps of particles or may include layers of the different materials.

In some embodiments, the particle-liquid mixture/dispersion may be spread and flattened on a surface, as shown in FIG. 7. The flattened particle-liquid mixture/dispersion may have a thickness of about 1 mm or less, for example.

Referring to operation 106 in FIG. 1A, the particle-liquid dispersion is then processed, e.g., rolled, pressed, extruded, cast, or the like, to form a playdough-like amalgamation preform without solidifying the liquid base metal. The playdough-like amalgamation preform may be formed including bars, sheets, ingots, filaments, or any suitable shapes. For example, the playdough-like amalgamation preform may be rolled to have a thickness ranging from about 5 microns to about 500 microns.

The playdough-like amalgamation preform may then be used directly or may be solidified at 108 in FIG. 1A to form a solid amalgamation preform. The solid amalgamation preform may have a shape/dimension corresponding to the playdough-like amalgamation preform.

At 108 in FIG. 1A, the playdough-like amalgamation preform may be cooled, e.g., by liquid cooling, Peltier cooling, or submersion in a cooling liquid such as water or LN2. The coiling process may quench the playdough-like amalgamation preform without substantially inducing any reactions to provide corresponding solid amalgamation preform.

Figure 8:
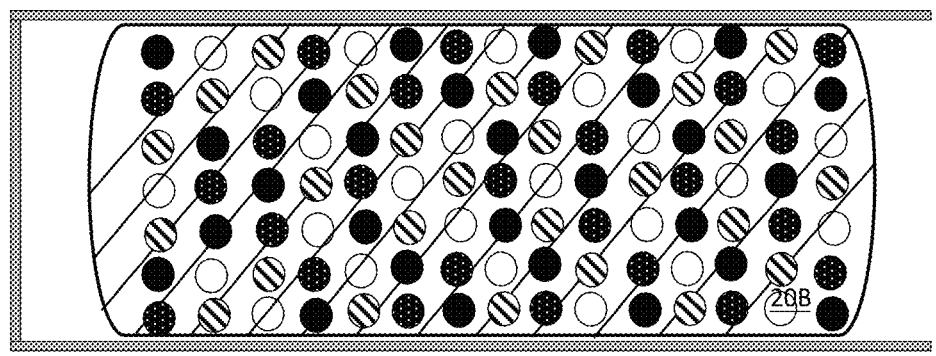
FIG. 8 illustrates an exemplary solidified particle-liquid dispersion in a container according to various embodiments of the present disclosure.

Alternatively, as illustrated in FIG. 1B, after forming the particle-liquid dispersion at operation 104, a solidification process at 107 may be performed such that the solid particles are uniformly dispersed in a solidified base metal without substantially inducing the reaction there-between, as illustrated in FIG. 8.

When solidifying the particle-liquid dispersion, the entire assembly, e.g., including the container and the particle-liquid dispersion contained therein, may be cooled, e.g., by liquid cooling, Peltier cooling, or submersion in a cooling liquid such as water. The coiling process may quench the particle-liquid dispersion without substantially inducing any reactions, e.g., without breaking a shell material of a reactive core material.

Still in FIG. 1B, at 109, the solidified particle-liquid dispersion may be processed to form a solid amalgamation preform by, rolling, drawing, forging, stamping, milling, turning, or the like. For example, the solidified, particle-liquid dispersion may be rolled to have a thickness of about 25 microns to about 10 mm, or in some cases, may be drawn into wires. In other cases, the solidified particle-liquid dispersion can be milled at room temperature or cryomilled to a powder formulation to form the solid amalgamation preform.

In this manner, the playdough-like amalgamation preform prepared at operation 106 in FIG. 1A or the solid amalgamation preform prepared at 108 in FIG. 1A and/or at 109 in FIG. 1B may be in an application form and ready for use.

It should be noted that no reactions will be substantially induced between the base metal and the reactive particles when performing the exemplary methods illustrated in FIGS. 1A-1B. For example, the formed playdough-like amalgamation preform may include various types of solid particles magnetically dispersed in the liquid base metal, and no reactions substantially occur between the reactive particles and the liquid base metal at a near room temperature (e.g., about 25° C.) or less. The formed solid amalgamation preform may include various types of solid particles magnetically dispersed in the solid base metal, and no reactions substantially occur between the reactive particles and the solid base metal at a near room temperature (e.g., about 25° C.) or less.

Figure 9A:
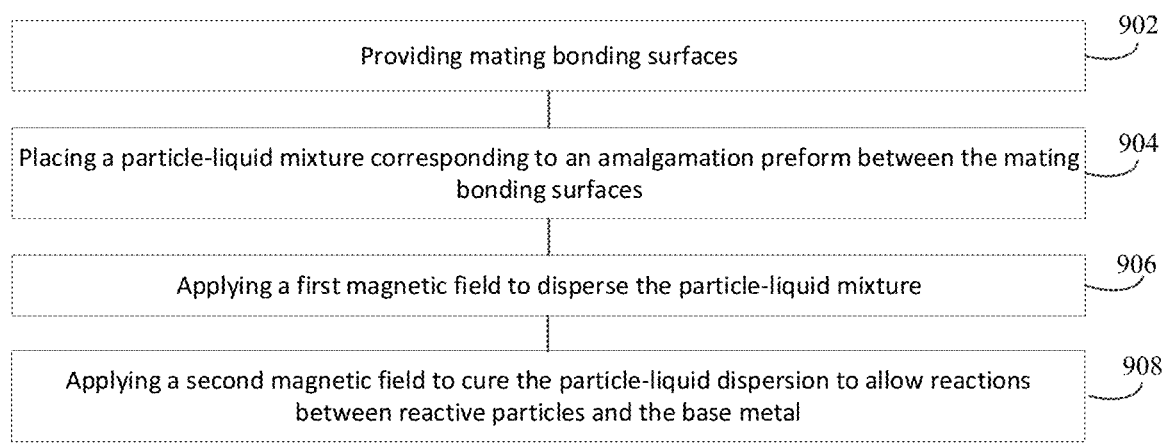
FIG. 9A illustrates an exemplary method for using an amalgamation preform according to various embodiments of the present disclosure.
Figure 9B:
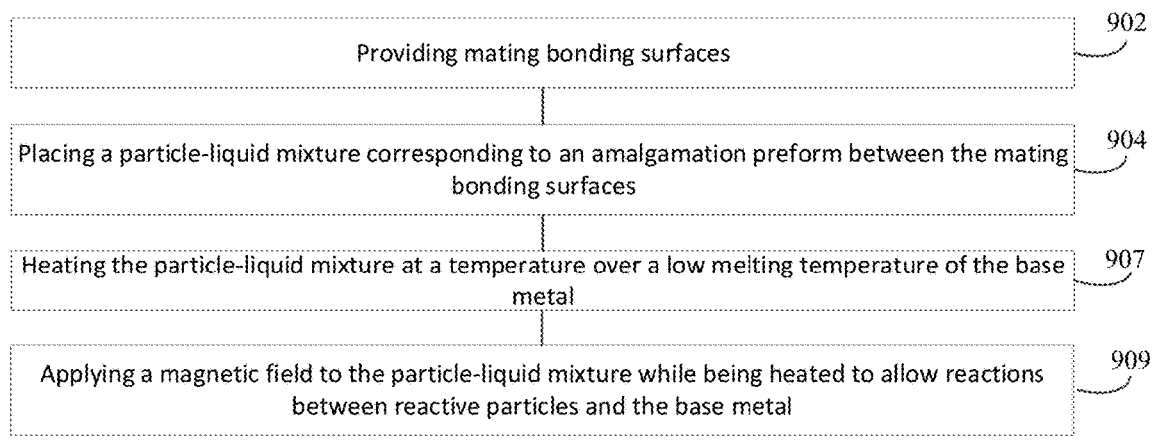
FIG. 9B illustrates another exemplary method for using an amalgamation preform according to various embodiments of the present disclosure.

FIGS. 9A-9B illustrate exemplary methods for using an amalgamation preform according to various embodiments of the present disclosure.

At 902 in FIGS. 9A-9B, mating bonding surfaces are provided.

As used herein, the terms "mating surface," "bonding surface," and "mating bonding surface" may be used interchangeably in the present disclosure. Accordingly, the term "bonding material" may refer to any material being placed and processed between mating bonding surfaces, e.g., for re-flow, re-dispersion, and bonding/curing/alloying.

The bonding material may therefore include, for example, particle-liquid mixture (e.g., as illustrated at 102 in FIGS. 1A-1B), particle-liquid dispersion (e.g., as illustrated at 104 in FIGS. 1A-1B), and/or any amalgamation preform, including a playdough-like amalgamation preform (e.g., as illustrated at 106 in FIG. 1A), and/or a solid amalgamation preform (e.g., as illustrated at 108 in FIG. 1A and 109 in FIG. 1B).

The mating bonding surfaces may be provided by two mating substrates. In some cases, the mating bonding surfaces may be opposite surfaces in one substrate. The mating bonding surfaces may be provided for placing particle-liquid mixture/dispersion, and/or amalgamation preform (e.g., playdough-like amalgamation preform and/or solid amalgamation preform) there-between for bonding/curing/alloying of the particle-liquid mixture corresponding to an amalgamation preform.

For illustration purposes, the exemplary method for using amalgamation preform is described using a pair of mating surfaces as an example, although the bonding material may also be placed on one bonding surface or between bonding surfaces of a same substrate according to various embodiments of the present disclosure.

The bonding surface may include an engineering metal such as steel with a gold coating, an FCC (face centered cubic) metal, e.g., in a bulk form or a plated form, a ceramic, e.g. silicon carbide, silicon dioxide, and/or aluminum nitride, and/or an insulator including glass, quartz, and/or sapphire. The insulator may or may not be metallized prior to bonding. The two bonding surfaces may be made of same or different material.

In various embodiments, optionally, the bonding surface may be pre-treated to provide a bonding surface sufficiently cleaned and/or free of any excessive oxides.

For example, the bonding surface may be solvent cleaned by a submersion in a solvent containing acetone, alcohol, and/or di-water at a temperature of 20° C. or less. In some other cases, the bonding surface may be first cleaned in acetone and in alcohol, followed by a di-water rinse to clean the surface.

In another example, when the bonding surface is made of a metal, e.g., Cu or Ag, excessive oxides of copper or silver may be formed on the bonding surface. The bonding surface may be pre-treated to remove such excessive oxide, e.g., by a mechanical abrasion via p2000 grit or 0000 steel wool to brighten the processed surface, and/or by a chemical etch via NaOH with a subsequent di-water rinse.

On the other hand, it should be appreciated that a certain (or small) amount of native oxides may be retained on the bonding surfaces without being completely removed. This may avoid possible alloying between the bonding material and the bonding surface.

In various embodiments, the processed bonding surfaces may have a surface roughness ranging from 1 nm to 100 microns. Such roughness is desirable for providing adhesion with the bonding material during subsequent re-flow, re-dispersion, and/or curing processes. In contrast, although a too-smooth surface of the bonding surface may be used for the bonding/curing process, it is not desirable to facilitate re-mixing and curing of the bonding materials.

At 904 in FIGS. 9A-9B, a particle-liquid mixture, e.g., which may correspond to an amalgamation preform, is placed between bonding surfaces. The particle-liquid mixture may include various types of solid particles and base metal, similar to, same as, or different than those illustrated in FIGS. 1A-1B and 2-8.

In some embodiments, the particle-liquid mixture for bonding/curing/alloying may be obtained from operation 102 in FIGS. 1A-1B. In other embodiments, the particle-liquid mixture for bonding/curing/alloying may be obtained from a playdough-like amalgamation preform (e.g., obtained at 106 in FIG. 1A) and/or a solid amalgamation preform (e.g., obtained at 108 in FIG. 1A and 109 in FIG. 1B) by a heating process, e.g., by a convective/inductive heating generated by controlling a magnetic field, and/or by any other suitable heating process.

At 906 in FIG. 9, a first magnetic field is applied to disperse the particle-liquid mixture to form a particle-liquid dispersion.

In various embodiments, the application of the first magnetic field at operation 906 in FIG. 9, may be similar to or same as the application of the magnetic field at operation 104 in FIGS. 1A-1B, such that various types of solid particles in the particle-liquid mixture may be homogeneously, or otherwise controllably, dispersed to form the particle-liquid dispersion.

Figure 10:
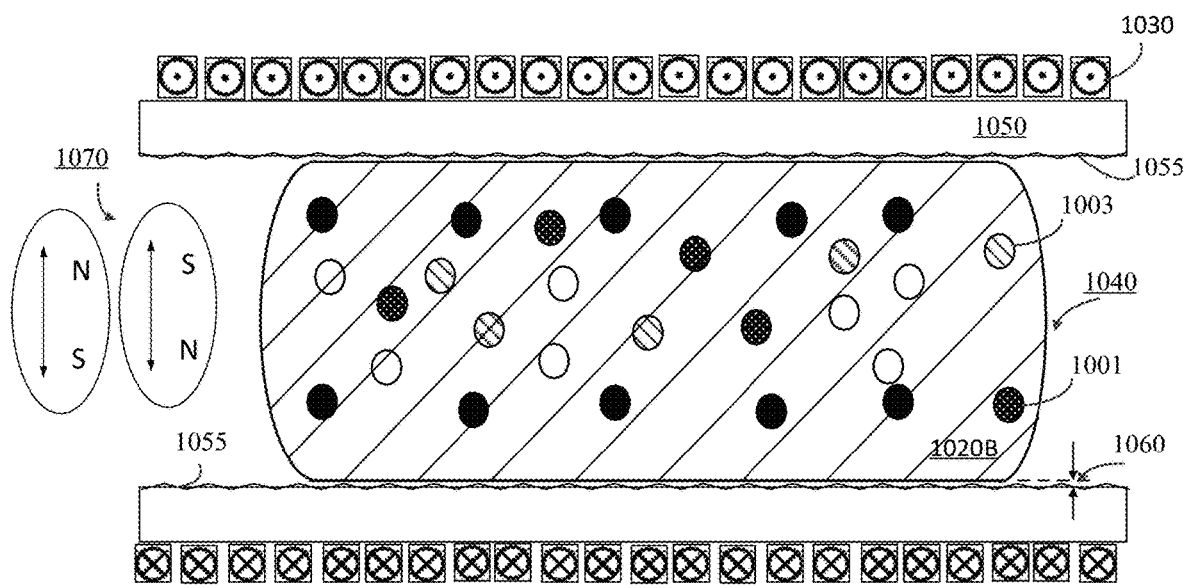
FIG. 10 illustrates an exemplary apparatus including a magnetic processing device for processing a solid amalgamation preform according to various embodiments of the present disclosure.

FIG. 10 illustrates an exemplary configuration having a solid amalgamation preform placed between bonding surfaces for bonding/curing/alloying according to various embodiments of the present disclosure.

Figure 11:
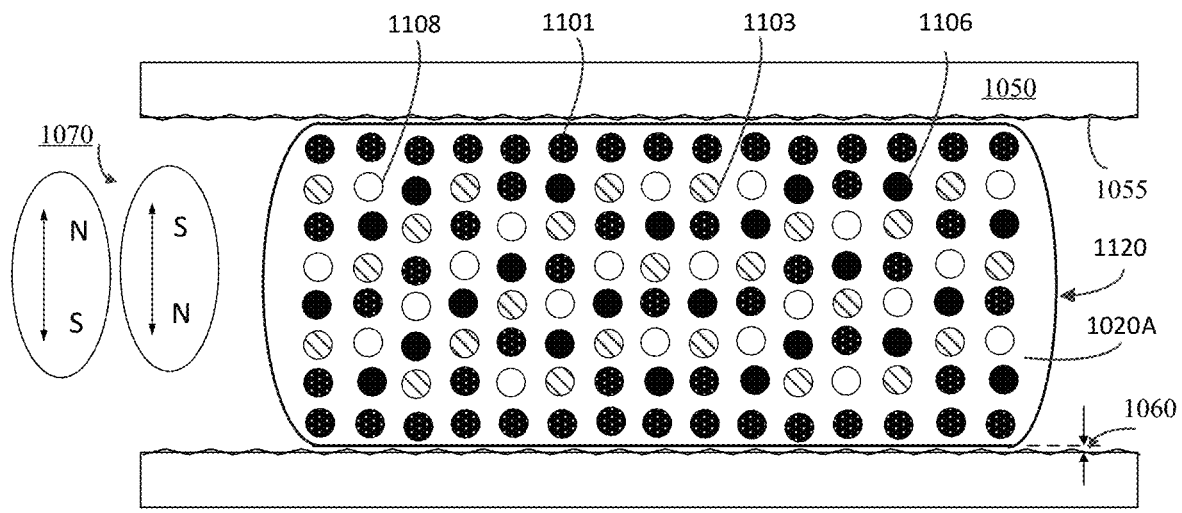
FIGS. 11-15 illustrate exemplary mixing and dispersion of a liquefied amalgamation preform under modulated applications of magnetic field according to various embodiments of the present disclosure.

In FIG. 10, a solid amalgamation preform 1040, as an example, is placed between bonding surfaces 1055 of mating substrates 1050. The bonding surface 1055 may have a disclosed surface roughness for better handing the bonding materials at the interface there-between. The solid amalgamation preform 1040 is then heated, e.g., using a magnetic processing device 1030 (or any other suitable heating means), to liquefy a solid base metal 1020B to form a corresponding particle-liquid mixture having a liquid base metal 1020A, as shown in FIG. 11. Under magnetic controlling at 1070 in FIG. 11, the solid particles in the particle-liquid mixture may be homogeneously dispersed to form the particle-liquid dispersion.

As shown in FIGS. 10-11, various particles as disclosed herein may include, e.g., reactive particles 1001/1003 and 1101/1103 (e.g., at least including reactive magnetic particles 1001/1101 and reactive non-magnetic particles 1003/1103), non-reactive magnetic particles 1006/1106, and/or any other possible solid additives 1008/1108.

Returning to FIG. 10, each bonding surface 1055 may be arranged having a gap 1060 with the solid amalgamation preform 1040. The gap 1060 may have an initial thickness between the bonding surface 1055 and the solid amalgamation preform 1040. Such initial thickness may allow the solid amalgamation preform 1040 to contact each bonding surface 1055 with no pressure or a small pressure (<1 MPa) applied to the solid amalgamation preform 1040. In an undesirable case that a large pressure is applied, the mating bonding surfaces may tend to compress towards one another and the constituents of the solid amalgamation preform may likely be separated, resulting in undesirable curing effect of the bonding material.

The initial thickness of the gap 1060 may be maintained throughout the bonding/curing/alloying process, e.g., using a physical spacer or a spatial constraint of both bonding surfaces 1050. For example, a jig or robotic holding may be used to maintain the initial thickness of the gap 1060.

FIGS. 11-14 illustrate controllable applications of the first magnetic field to the exemplary particle-liquid mixture 1120 between the bonding surfaces 1055 to magnetically disperse the plurality of types of solid particles (e.g., particles 1101, 1103, 1106, and/or 1108) in the liquid base metal 1020A to form a particle-liquid dispersion. During this process, the reactive particles 1101/1103 may or may not have reactions with the liquid base metal 1020A. For example, the first magnetic field may be applied in a manner without breaking the shell material to allow reactions to occur.

In one embodiment, a magnetic processing device, e.g., the device 1030 in FIG. 10, may be used to apply the first magnetic field. The magnetic processing device may include coils winding around the bonding substrates 1050. The shape and dimension of the wire used in a coil winding may be determined based on the specific application of the first magnetic field. For example, the coil winding may have uniform shape and dimension and may be wound evenly or un-evenly distributed along the length direction of the bonding substrates.

The magnetic processing device may be connected to or include a controller (now shown), such as a computer controller, to control current and/or current changing of the coil winding and to thus control, e.g., polarity, strength, localization, motion, rotation, spinning, etc. of the first magnetic field. For example, a certain length of coils may be selected by the controller to selectively apply the first magnetic field to a partial amount of the particle-liquid mixture. In another example, the first magnetic field may be controlled and changed along a certain direction, e.g., along the length direction of the bonding substrates. In still another example, the controller may control the coils winding to repeatedly provide rotational field and/or translational field, e.g., back and forth along a certain direction. In still another example, the controller may control the coils winding to move the particle-liquid mixture/dispersion between different positions along the bonding surface of the bonding substrate, or to move the particle-liquid material out of the bonding substrates.

The first magnetic field may be applied in any suitable manner. Other suitable magnetic processing device may include electromagnets and/or physical permanent magnets that are controllable for heating, mixing, dispersion, etc. For example, an electronic control of electromagnets and/or a control of moving physical permanent magnets may be performed to provide the first magnetic field.

Figure 12:
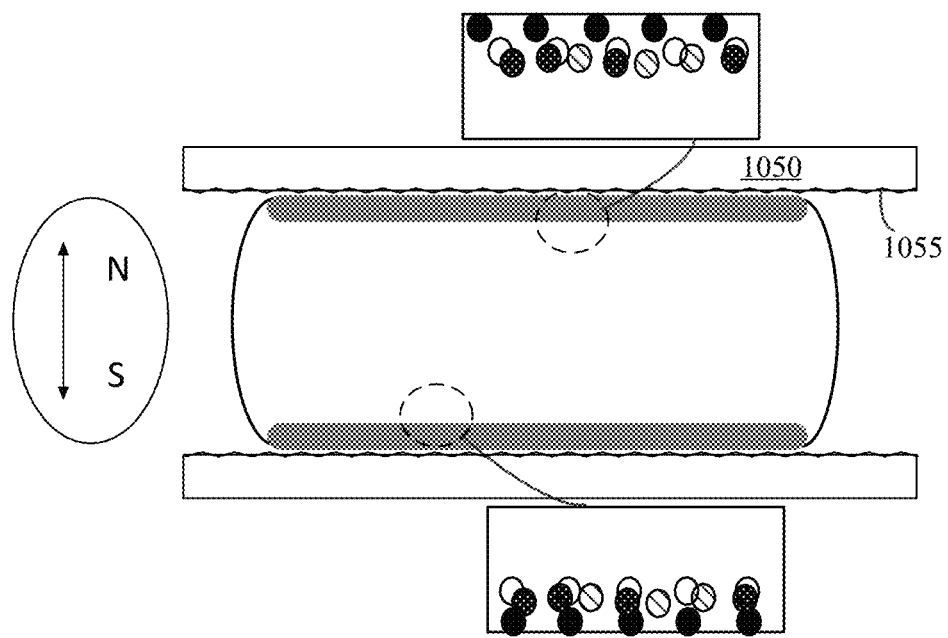

In one embodiment, the first magnetic field may be applied and aligned, such that solid particles in the liquid base metal may be pulled and moved towards interfaces with the bonding surfaces, e.g., as shown in FIG. 12, illustrating that the solid particles, including the reactive magnetic particles 1101, the reactive non-magnetic particles 1103, the non-reactive magnetic particles 1106, and the solid additives 1108 (referring to FIG. 11), are pulled at the interfaces with the bonding surfaces. In the meanwhile, the first magnetic field may be used to heat and maintain the base metal in the liquid form.

Figure 13:
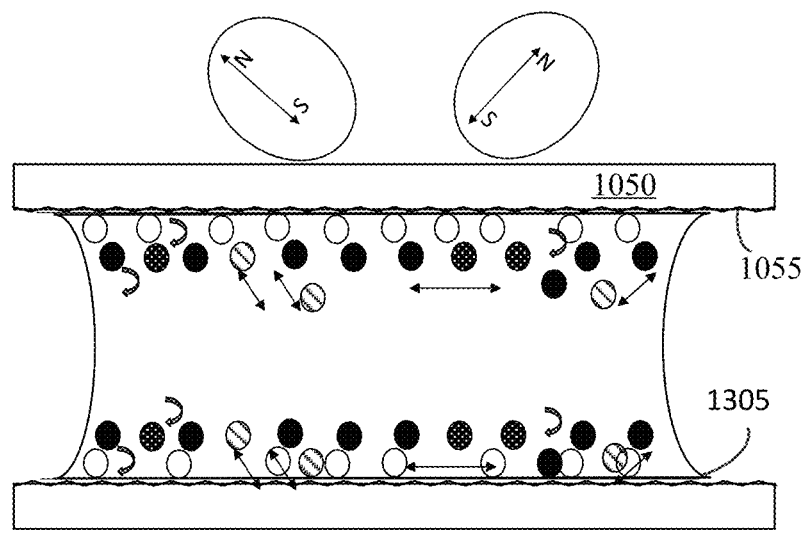
Figure 14:
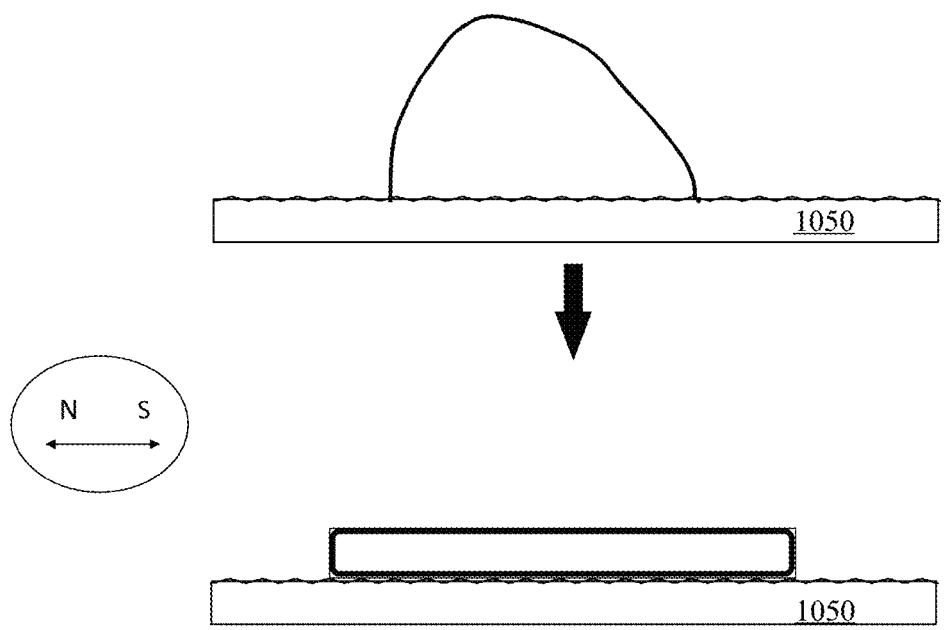

The first magnetic field may be moved in various angles to drag the solid particles across two bonding surfaces, e.g., moving through the cross section of the bonding material, in any suitable shape or motion path, e.g., as shown in FIG. 13, illustrating that the solid particles, including the reactive magnetic particles 1101, the reactive non-magnetic particles 1103, the non-reactive magnetic particles 1106, and the solid additives 1108 (referring to FIG. 11), are dragged to the bonding surfaces. The solid particles dragging on the bonding surface may scrape, remove, and/or break the native oxide layer formed at the outermost layer 1305 of the bonding material (e.g., particle-liquid mixture) at the interface, allowing for dispersion and wetting. In some embodiments, large-size particles may allow for more force compared to the viscous forces experienced in the bonding material and may have a better chance of making the solid particles move to the bonding material-bonding surface interface, e.g., as shown in FIG. 14. As such, motion of magnetic particles may be controlled to improve surface wetting to eliminant the need for fluxing agent, and to reduce voiding and gaps that are often generated in conventional solder materials.

The application of the first magnetic field may allow movement and dispensing of all solid particles in the bonding material. Instead of driving via a mechanical force which often compresses the particles and drives the liquid component out, the disclosed particle-liquid mixture/dispersion may be moved as a slug from one position to another and does not squeeze out the liquid component. Additionally, the first magnetic field can also be used to smooth the particle-liquid mixture after it is dispensed as a large "slug" as shown in FIG. 14.

The non-reactive solid particles may be used to drive, spread, mix, and/or heat the particle-liquid mixture for forming homogeneous particle-liquid dispersion, which may drive homogeneous reactions for curing and may further strengthen the bonded material.

Figure 15:
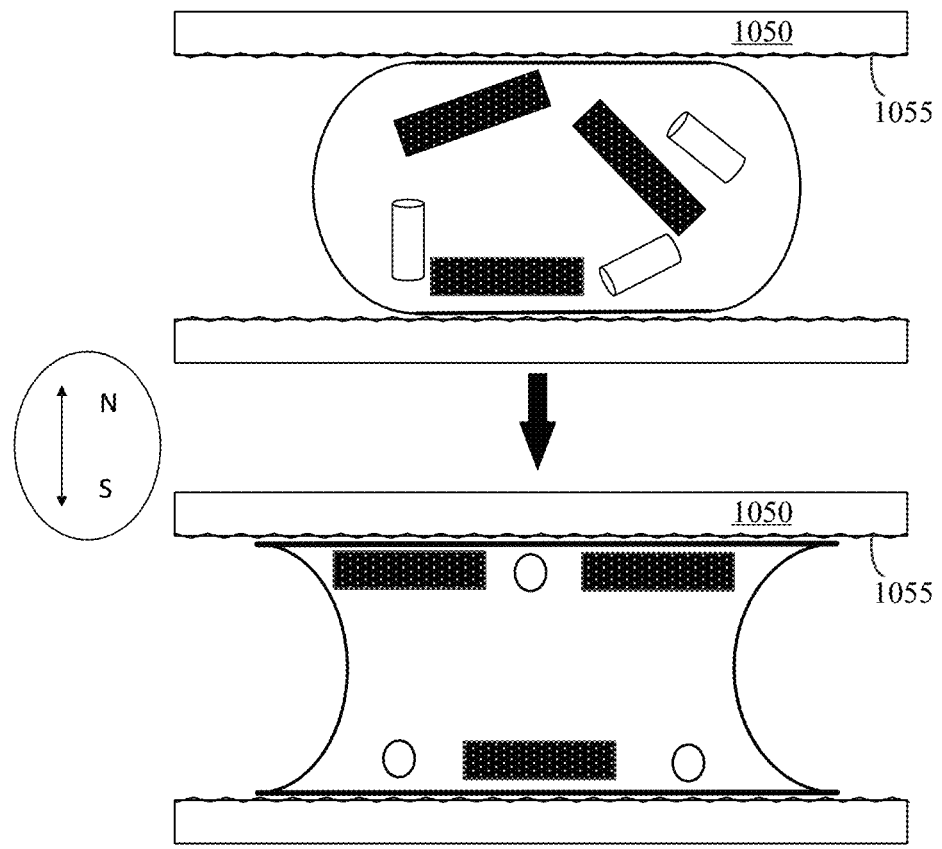

In one embodiment, a gradient static magnetic field may be used to align magnetic fibers or wires within the bonding material to provide preferential and anisotropic properties, e.g., see FIG. 15. For example, large size magnetic particles of Fe, Ni, Co, Cr, Nb, AND/or their alloys may be incorporated into the particle-liquid mixture for bonding. The magnetic alignment may be varied to produce various properties, such as anisotropic thermal conductivity and/or mechanical strength.

Instead of having a conventional mechanical mixing, the disclosed magnetic mixing may be performed, e.g., via dynamic magnetic field or a helical magnetic field, driving motions of the solid magnetic particles (being reactive or non-reactive with or without large-size) through the bonding material. For example, under a dynamic magnetic field, the plurality of types of solid particles as disclosed may be attracted towards the interfaces between the bonding material and the bonding surfaces. Once at the interfaces, the solid particles can be moved in-plane to generate scratching or scraping of the interfaces to mix the native oxide (e.g., at 1305 in FIG. 13) of the base metal on the outer surface of the bonding material (e.g., at the interface) into the interior of the bonding material. The removal or disturbance of the oxide layer may allow metallic alloying to take place and increase interface strength.

The shape of the bonding material may be designed, for example, according to actual applications. The disclosed magnetic mixing/dispersing may be in random or ordered fashion and can be done simultaneously with magnetic heating.

At 908 in FIG. 9A, a second magnetic field is applied to cure the particle-liquid dispersion to allow reactions or curing between reactive particles and the base metal. During this curing operation, the temperature is no higher than 150° C., and in some embodiments, no higher than 100° C., and in some embodiments no higher than 50° C.

The second magnetic field may be applied in a manner different than the first magnetic field, e.g., in strength, polarity, duration, etc. The second magnetic field may be provided by a same magnetic processing device as for the first magnetic field but modulated differently.

Under the second magnetic field, the bonding material may be heated at a temperature to activate chemical reactions between the reactive particles and the base metal for curing/alloying, for example, at a temperature above the liquid component (bonding material obtained from operation 904 in FIG. 9A) melting pointing for the reactions to take place. During these curing/bonding/alloying processes, the temperature is no higher than 150° C., and in some embodiments, no higher than 100° C., and in some embodiments, no higher than 50° C.

As disclosed herein, the reactive particle may include a core-shell structure have a shell material at least partially covering a core material. In one embodiment, the shell material of reactive particles may be used to control kinetics and dissolution rates of the core material to thus control reaction rates between the reactive particles and the base metal for curing.

The shell material may have a thickness ranging from a thickness of an atomic layer to a thickness of about 100 nm, such as a thickness of several atomic layers. The shell material may be thick enough to largely prevent solid-state alloying between the reactive particle and solid base metal for amalgamation preform and may be thin enough to be overcome to undergo such reactions during curing. The thickness of the shell material may be controlled depending on the selection of the base metal and the reactive particles.

In an exemplary embodiment that the core material is one or more of Fe and Ni, the shell material is an oxide of the one or more of Fe and Ni, the rate of dissolution or ingress by the exemplary base metal Ga material through the shell material is dependent on the thickness of the shell material.

According to various embodiments, in addition to controlling shell thickness, other mechanisms may be applied to the core-shell structure of the reactive particles to thus control reaction kinetics/rates for curing/alloying.

For example, the reactive particle may include a shell material that reacts with the base metal more slowly than the core material to provide longer curing time. For example, the shell material may be copper and the core material may be gold, and the base metal may be Ga liquid, which reacts quicker with gold than Copper.

Another exemplary reactive particle may include a reactive shell material (e.g., Cu) and a non-reactive core material (e.g., Co, and/or a ceramic material including AlN, SiC, $SiO_2$, $TiO_2$, $ZrO_2$, $Al_2O_3$, BeO, $Si_3N_4$, $B_4C$, WC, and/or diamond). In some cases, the reactive shell material may include multi-layer having an oxide layer at least partially covering the reactive shell material. In one example, the shell material may be Cu and the core material may be Co, while the shell material may further include copper oxide covering the copper shell material. The magnetic properties of Co may be utilized for heating, mixing, or wetting, while the shell material may allow for a coherent interface and strong bonding of the bonding material with the bonding surface. In another example, the shell material may be Cu and the core material may be AlN, while the shell material may further include copper oxide covering the copper shell material.

In various embodiments, the shell material may be selected to incorporate to support and strengthen the solid alloy. In one example, the shell material of the reactive particle may be non-reactive and/or may partially cover the inner particle of the core material (e.g., as a patchy shell). When the inner particle is dissolved by the Ga liquid, the shell material may remain in the perform material to provide mechanical strengthen and form a composite. Such shell material may include a ductile material, including steel, and the core material may be Cu. In another example, the shell material may be a brittle oxide, such as ZnO or $TiO_2$, which can rupture due to mismatch of thermal expansion with the Cu, Ag, or Ni metal which is used as core material inside the shell material. The hard and brittle shell material may strengthen the solid alloy.

In various embodiments, the shell material may be broken during preform processing, e.g., curing/bonding/alloying. For example, the shell material of the reactive particle may be overcome via dissolution of the base metal due to, e.g., application of the second magnetic field. For example, under control of second magnetic field, an oxide shell material may be broken to allow its core material Fe or Cu to interact/react with the liquid base metal.

Figure 16:
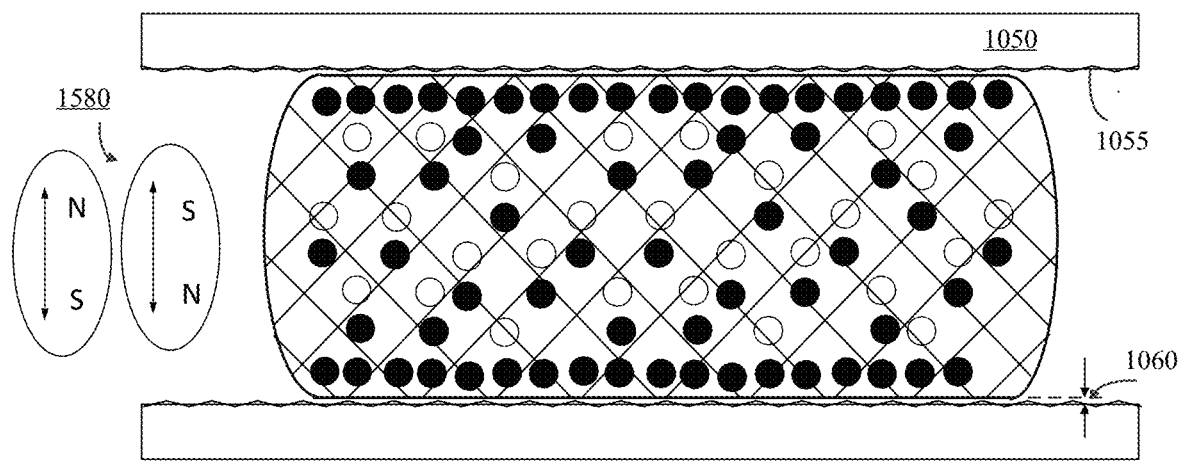
FIG. 16 illustrates an exemplary solid alloy corresponding to an amalgamation preform according to various embodiments of the present disclosure.

In various embodiments, the cured material, i.e., the bond or the solid alloy may be all metallic solid. FIG. 16 illustrates an exemplary solid alloy at least doped with non-reactive magnetic particles according to various embodiments of the present disclosure. The solid alloy may have a higher temperature stability than the curing temperature. As shown in FIG. 16, non-reactive particles may be retained in the solid alloy and may be uniformly dispersed therein, e.g., to provide desirable properties such as mechanical strength, high thermal and electrical conductivity.

FIG. 9B illustrates another exemplary method for using amalgamation preform according to various embodiments of the present disclosure.

After the operation 904 in FIG. 9B for placing the particle-liquid mixture corresponding to an amalgamation preform between the mating bonding surfaces, the particle-liquid mixture can be heated at a temperature over a low melting temperature of the base metal to re-flow the particle-liquid mixture, as illustrated at operation 907 in FIG. 9B.

The heating process at operation 907 in FIG. 9 can include any heating means through conduction, convention, or radiation, etc. For example, a pulsed laser may be used to heat the particle-liquid mixture. The heating process can be arranged while a magnetic field is applied to the particle-liquid mixture. During this heating process at operation 907 in FIG. 9B, the temperature is no higher than 150° C., and in some embodiments, no higher than 100° C., and in some embodiment no higher than 50° C.

At 909 in FIG. 9B, a magnetic field is applied on the particle-liquid mixture while being heated to allow reactions between reactive particles and the base metal to occur. During this reaction operation 909, the temperature is no higher than 150° C., and in some embodiment, no higher than 100° C., and in some embodiment no higher than 50° C.

Under the magnetic field, the bonding material may be dispersed and further heated at a temperature to activate chemical reactions between the reactive particles and the base metal for curing, for example, at a temperature above the liquid component (bonding material obtained from operation 904 in FIG. 9A) melting pointing for the reaction to take place.

For example, a magnetic processing device (e.g., as illustrated in FIG. 10) may be used and controlled to modulate the magnetic field. For example, the magnetic processing device may include coils winding around the mating bonding substrates. The shape and dimension of the wire used in a coil winding may be determined based on the specific application of the magnetic field.

The magnetic processing device may be connected to or include a controller, such as a computer controller, to control current and/or current changing of the coil winding and to thus control, e.g., polarity, strength, localization, motion, rotation, spinning, etc. of the first magnetic field. For example, a certain length of coils may be selected by the controller to selectively apply the magnetic field to a partial amount of the particle-liquid mixture to locally disperse solid particles in the particle-liquid mixture. In another example, the magnetic field may be controlled and changed along a certain direction, e.g., the length direction of the bonding substrates. In still another example, the controller may control the coils winding to repeatedly provide rotational field and/or translational field, back and forth along a certain direction. In still another example, the controller may control the coils winding to move the particle-liquid mixture/dispersion between different positions along the bonding surface of the bonding substrate, or to move the particle-liquid material out of the bonding substrates.

Other suitable magnetic processing device may include electromagnets and/or physical permanent magnets that are controllable for heating, mixing, dispersion, etc. For example, an electronic control of electromagnets and/or a control of moving physical permanent magnets may be performed to provide the first magnetic field.

The magnetic particles in the particle-liquid mixture may be aligned, moved, and dispersed, while being heated. The magnetic field may be modulated such that the orientation of the particles changes and the motion of the magnetic particles provide mixing/dispersing within the cross-section of the particle-liquid mixture. The magnetic motion may be rotational, translational, or the mixture of rotational and translational such that the particles moves within the cross section of the particle-liquid mixture. During this course, the bonding surfaces may come in contact with some moving liquids, the moving liquids may then break and disperse the native oxide layer at the outermost of the particle-liquid mixture, allowing for a fresh interface.

In addition to more uniformly dispersing particles in the particle-liquid mixture, the magnetic field may be modulated to allow reactions between the reactive particles and the base material to form solid alloy.

As such, under the magnetic field, various types of solid particles may be oriented, moved, and/or aligned along the whole cross section of a bonding material containing the particles. When under dynamic magnetic field, particles align and move along the motion of the magnetic field. Various motions of particles can be introduced under the application of the magnetic field. For example, under a spinning magnetic field, radial motions of particles can be generated, which may essentially scrap and mix the bonding material at the interfaces between the bonding material and the bonding surface. Motions of particles may cause stirring at the interfaces. By dynamically controlling/modulating the magnetic field, concentrations in different places may be controlled. The motions of particles may fill up the voids in the bonding material to re-distribute the particles throughout the cross section of bonding material. Such distribution may provide uniform chemical composition. In addition, the surface bonding at the interfaces may be broken and changed due to motion of the particles to provide wetting on the contact substrate, which may homogenize the composition and with uniform distribution. Further, fluctuating the magnetic field and heating through the cross section may provide localized distribution of heating and concentration.

Conventionally, fluxing is necessary for the adhesion of solders/bonding materials that form native oxide layers. Typically, the flux is applied and used to clean and wet the bonding surfaces before the bonding processes. However, the flux brings in several drawbacks. For example, it may bring corrosivity and contamination to bonding parts, and it has adverse health efforts caused by the fumes and outgases during bonding and processing. Flux material is also often mixed in with the metallic powders in preforms to aid in interface bonding with bonding surfaces. For example, the surfaces or exterior of a bonding material may have flux mixed therein, while the interior of the bonding material may have no flux. However, agitation is needed at the bonding interface to break the native oxide layer that floats on outer surface of the bonding material, otherwise the adhesion at the interface is undesirably poor. The conventional preforms cannot sufficiently adhere to most bonding surfaces.

The modulated magnetic field may allow various types of solid particles as disclosed to move towards the interfaces between the bonding material and the bonding surfaces, and to further generate scratching or scraping at such interfaces to break the native oxide of the base metal on the outer surface (e.g., at 1305 in FIG. 13) of the bonding material and mix the broken native oxide from the outer surface of the bonding material (e.g., at the interfaces) into the interior of the bonding material. The native oxide of the base metal scrapped from the outer surface into the interior of the bonding material may mechanically strengthen the resultant bonding material and may further allow the base metal to directly interact with and wet the bonding surfaces.

As such, the need for prewetting the bonding substrate or for any fluxing agent in the bonding materials is eliminated by applying the disclosed particle-liquid mixture in combination with the modulated magnetic field according to various embodiments of the present disclosure.

The resulting cured bonds, which are in a completely new and much stabler alloy state, can now withhold much higher temperature experienced by the bonding surfaces (and the parts thereof). In one embodiment, the resulting cured bonds can withhold a higher temperature than the curing temperature, for example, a high temperature of about 200° C. or higher, such as about 260° C. or higher.

The present disclosure is disclosed as above, but the present disclosure is not limited by disclosed embodiments. Various changes and modifications may be made by those skilled in the art without departing from the spirit and scope of the present disclosure. Therefore, the scope of the present invention should be subject to the scope defined by the claims.

What is claimed is:

1. An amalgamation preform, comprising:
a base metal, and
a plurality of types of solid particles dispersed in the base metal, the base metal including one of a liquid base metal and a solid base metal,
wherein the plurality of types of solid particles at least includes:
non-reactive magnetic particles, responsive to a magnetic field for controllably dispersing the plurality of types of solid particles in the base metal, and
reactive particles, capable of being reactive with the base metal under the magnetic field for amalgamation; and
wherein all of the plurality of types of solid particles are solely located in one or more regions that are proximal to an outermost surface of the amalgamation preform.

2. The preform according to claim 1, wherein:
the base metal includes Ga, In, Sn, Bi, Pb, Cd, Hg, Rb, Zn, Bi, or a combination thereof.

3. The preform according to claim 1, wherein:
the reactive particle at least includes a reactive metal material, the reactive metal material including Fe, Ni, Cu, Ag, Au, In, Cu, Sn, Bi, Zn, Ti, V, Cr, Mo, Nb, Zr, Hf, Pt, Ir, or a combination thereof.

4. The preform according to claim 1, wherein:
a particle of the reactive particle includes a core-shell structure, wherein:
the core-shell structure includes a core material, and a shell material different than the core material and at least partially surrounding the core material, and
the core material has a reaction rate with the base metal different than the shell material.

5. The preform according to claim 4, wherein:
the shell material has a thickness ranging from a thickness of an atomic layer to a thickness of about 100 nm.

6. The preform according to claim 4, wherein:
the core material includes a reactive metal material, and the shell material includes an oxide layer of the reactive metal material.

7. The preform according to claim 4, wherein:
the core-shell structure includes one or more of:
a core-shell structure having the shell material including an oxide of one or more of Fe and Ni, and the core material including the one or more of Fe and Ni;
a core-shell structure having the shell material including Cu, and the core material including Au;
a core-shell structure having the shell material including steel, and the core material including Cu;
a core-shell structure having the shell material including ZnO or TiO2, and the core material including Cu, Ag, Ni, or a combination thereof; and
a core-shell structure having the shell material including Cu and copper oxide at least partially covering Cu, and the core material including Co, BeO, $Si_3N_4$, $B_4C$, WC, diamond, AlN, SiC, $Si_O2$, $TiO_2$, $ZrO_2$, $Al_2O_3$, or a combination thereof.

8. The preform according to claim 1, wherein:
the reactive particle includes a reactive magnetic particle, a reactive non-magnetic particle, or a combination thereof.

9. The preform according to claim 8, wherein:
the reactive magnetic particle includes one or more of Fe and Ni.

10. The preform according to claim 8, wherein:
the reactive magnetic particles have an average size of more than about 50 microns.

11. The preform according to claim 8, wherein:
the reactive non-magnetic particle includes Cu, Ag, Au, In, Cu, Sn, Bi, Zn, Ti, V, Cr, Mo, Nb, Zr, Hf, Pt, Ir, or a combination thereof.

12. The preform according to claim 1, wherein:
a ratio of the base metal over the plurality of types of solid particles ranges from 4:1 to 1:4 by weight.

13. The preform according to claim 1, wherein:
the plurality of types of solid particles have an average size ranging from about 100 nm to about 100 μm.

14. The preform according to claim 1, wherein:
the reactive particles have an average size ranging from about 100 nm to about 50 μm.

15. The preform according to claim 1, wherein:
the non-reactive magnetic particles have an average size ranging from about 5 microns to about 100 microns.

16. The preform according to claim 1, wherein:
the non-reactive magnetic particles include Co-containing particles, Nd-containing particles, Cr-containing particles, or a combination thereof.

17. The preform according to claim 1, wherein:
the non-reactive magnetic particles include large-size magnetic particles having at least one dimension greater than 5 μm, and
the large-size magnetic particles include microwires, microfibers, or combination thereof, and a length direction of the microwires and the microfibers is aligned, in parallel with a direction along the outermost surface of the amalgamation preform.

18. The preform according to claim 1, wherein:
the plurality of types of solid particles further includes additives, including semiconductor particles, metal doped semiconductor particles, or combination thereof, and
the semiconductor particles include SiC particles, AlN particles, $SiO_2$ particles, or a combination thereof.

19. The preform according to claim 1, wherein the amalgamation preform includes a solid amalgamation preform, including the plurality of types of solid particles magnetically dispersed in the solid base metal, wherein no reactions occur between the reactive particles and the solid base metal at a temperature of about 25° C. or less.

20. A amalgamation preform, comprising:
a liquid base metal, and
a plurality of types of solid particles magnetically dispersed in the liquid base metal without solidifying the liquid base metal,
wherein
the plurality of types of solid particles at least includes:
non-reactive magnetic particles, responsive to a magnetic field for controllably dispersing the plurality of types of solid particles in the liquid base metal, and
reactive particles, wherein
all of the plurality of types of solid particles are solely located in one or more regions that are proximal to an outermost surface of the amalgamation preform,
the reactive particles are capable of being reactive with the liquid base metal under the magnetic field for amalgamation, and
no reactions occur between the reactive particles and the liquid base metal at a temperature of about 25° C. or less.

* * * * *